US008623320B2

(12) United States Patent
Song et al.

(10) Patent No.: US 8,623,320 B2
(45) Date of Patent: Jan. 7, 2014

(54) MG-TI-AL COMPOSITE METAL HYDROXIDE HAVING A LAMINATED STRUCTURE, AND A PRODUCTION METHOD THEREFORE

(71) Applicants: Shin Won Chemical Co., Ltd., Gyeonggi-do (KR); Shin Won Industrial Co., Ltd., Gyeonggi-do (KR)

(72) Inventors: Seok Keun Song, Gyeonggi-do (KR); Sung Yeon Kim, Gyeonggi-do (KR); Hee Soo Kim, Gyeonggi-do (KR); Kwang Hee Lee, Gyeonggi-do (KR)

(73) Assignees: Shin Won Chemical Co., Ltd., Gyeonggi-do (KR); Shin Won Industrial Co., Ltd., Gyeonggi-do (KR)

( * ) Notice: Subject to any disclaimer, the term of this patent is extended or adjusted under 35 U.S.C. 154(b) by 0 days.

(21) Appl. No.: 13/646,291

(22) Filed: Oct. 5, 2012

(65) Prior Publication Data
US 2013/0126780 A1 May 23, 2013

Related U.S. Application Data

(63) Continuation of application No. PCT/KR2010/002218, filed on Apr. 9, 2010.

(30) Foreign Application Priority Data

Apr. 8, 2010 (KR) ........................ 10-2010-0032353

(51) Int. Cl.
| | | |
|---|---|---|
| C01G 23/04 | (2006.01) | |
| C01F 7/02 | (2006.01) | |
| C01F 5/00 | (2006.01) | |
| C09K 21/02 | (2006.01) | |
| C09K 3/00 | (2006.01) | |

(52) U.S. Cl.
USPC . 423/598; 423/600; 423/594.16; 252/182.22; 252/182.11; 252/606; 252/609

(58) Field of Classification Search
USPC ........ 252/182.33, 182.11, 606, 609; 423/598, 423/600, 594.16
See application file for complete search history.

(56) References Cited

U.S. PATENT DOCUMENTS

| | | | | |
|---|---|---|---|---|
| 4,904,634 | A * | 2/1990 | Wieserman et al. | 502/401 |
| 5,972,245 | A * | 10/1999 | Schiller et al. | 252/397 |
| 2002/0156169 | A1* | 10/2002 | Kondo et al. | 524/432 |
| 2003/0165638 | A1* | 9/2003 | Louks et al. | 427/600 |
| 2008/0135802 | A1* | 6/2008 | Saito et al. | 252/182.1 |
| 2009/0105387 | A1* | 4/2009 | Wehner et al. | 524/425 |
| 2011/0024168 | A1* | 2/2011 | Okabe et al. | 174/258 |
| 2013/0126780 | A1* | 5/2013 | Song et al. | 252/182.33 |

FOREIGN PATENT DOCUMENTS

| | | |
|---|---|---|
| EP | 0749941 A1 | 12/1996 |
| JP | 2001-002408 A | 1/2001 |
| JP | 2008-214480 A | 9/2008 |
| KR | 10-2009-0037861 A | 1/2009 |

OTHER PUBLICATIONS

International Search Report in related PCT/KR2010/002218 dated May 26, 2011.

* cited by examiner

*Primary Examiner* — Joseph D Anthony
(74) *Attorney, Agent, or Firm* — Kramer / Amado, P.C.

(57) ABSTRACT

The present invention relates to a novel Mg—Ti—Al composite metal hydroxide and to production method therefor. Mg—Ti—Al composite hydroxide particles can be obtained by subjecting a solution containing a magnesium salt and a titanium salt to ultrasound processing and carrying out a high-temperature and high-pressure reaction with a solution containing an aluminum salt in the proportions of the metal elements comprised in the Mg—Ti—Al composite metal hydroxide, thereby giving the advantageous effects that the halogen capturing ability is excellent and, when used in a polymer, degradation and early-staining prevention properties and transparency are outstanding.

15 Claims, 9 Drawing Sheets

| Formulation | |
|---|---|
| PVC | 100.0 phr |
| DOP | 30.0 phr |
| CaCo3 | 20.0 phr |
| Zn-ST | 0.3 phr |
| Ca-ST | 0.2 phr |
| DBM | 0.1 phr |
| Sample | 2.0 phr |

| Condition | | | |
|---|---|---|---|
| ROLL (CURE) | Temp. | 170 | °C |
| | Time | 4 | min |
| | Thick. | 0.6 m/m | |
| OVEN | Temp. | | °C |
| | Time | | min |
| PRESS | Temp. | 180 | °C |
| | Time | 30 | min |

Particularity:

| DATA NAME | L*(D65) | a*(D65) | b*(D65) | WI(CIE) | YI(D1925) |
|---|---|---|---|---|---|
| Comparative Ex.1 | 94.69 | −1.51 | 9.64 | 42.84 | 17.79 |
| Comparative Ex.2 | 95.12 | −1.38 | 8.97 | 47.10 | 16.68 |
| Comparative Ex.3 | 94.54 | −1.42 | 9.63 | 42.46 | 17.87 |
| Example 1 | 95.44 | 1.13 | 7.07 | 56.59 | 13.47 |

FIG. 7

| Formulation | | |
|---|---|---|
| PVC | 100.0 phr | |
| DOP | 30.0 phr | |
| CaCo3 | 20.0 phr | |
| Zn-ST | 0.3 phr | |
| Ca-ST | 0.2 phr | |
| DBM | 0.1 phr | |
| Sample | 2.0 phr | |

| Condition | | | |
|---|---|---|---|
| ROLL (CURE) | Temp. | 170 | °C |
| | Time | 4 | min |
| | Thick. | 0.6 m/m | |
| OVEN | Temp. | | °C |
| | Time | | min |
| PRESS | Temp. | 180 | °C |
| | Time | 30 | min |

| DATA NAME | L*(D65) | a*(D65) | b*(D65) | WI(CIE) | YI(D1925) |
|---|---|---|---|---|---|
| Example 1 | 95.44 | −1.13 | 7.07 | 56.59 | 13.47 |
| Example 2 | 94.98 | −1.41 | 8.97 | 46.69 | 16.67 |
| Example 3 | 94.82 | −1.44 | 9.27 | 44.90 | 17.19 |
| Example 4 | 94.87 | −1.15 | 7.71 | 52.18 | 14.59 |

FIG. 9

| Formulation | | |
|---|---|---|
| PVC | 100.0 | phr |
| DOP | 30.0 | phr |
| CaCo3 | 20.0 | phr |
| Zn-ST | 0.3 | phr |
| Ca-ST | 0.2 | phr |
| DBM | 0.1 | phr |
| Sample | 2.0 | phr |

| Condition | | | |
|---|---|---|---|
| ROLL (CURE) | Temp. | 170 | °C |
| | Time | 4 | min |
| | Thick. | 0.6 m/m | |
| OVEN | Temp. | | °C |
| | Time | | min |
| PRESS | Temp. | 180 | °C |
| | Time | 30 | min |

Particularity

| DATA NAME | L*(D65) | a*(D65) | b*(D65) | WI(CIE) | YI(D1925) |
|---|---|---|---|---|---|
| Example 9 | 94.95 | −1.13 | 7.07 | 55.01 | 14.21 |
| Example 10 | 94.87 | −1.14 | 7.68 | 52.11 | 14.63 |
| Example 11 | 94.83 | −1.14 | 7.86 | 51.44 | 14.91 |
| Example 12 | 95.41 | −1.33 | 8.14 | 51.63 | 15.23 |

MG-TI-AL COMPOSITE METAL HYDROXIDE HAVING A LAMINATED STRUCTURE, AND A PRODUCTION METHOD THEREFORE

CROSS REFERENCE TO RELATED APPLICATIONS

This application is a continuation of and claims priority to International Patent Application No. PCT/KR2010/002218, filed Apr. 9, 2010, entitled "Mg—Ti—Al Composite Metal Hydroxide Having a Laminated Structure, And A Production method Therefor", which claims priority to Korean Patent Application No. 10-2010-0032353, filed on Apr. 8, 2010, the entire disclosures of both of which are hereby incorporated by reference in their entireties.

FIELD

The present invention relates to a novel Mg—Ti—Al composite metal hydroxide having a laminated structure and a method for synthesis thereof, and more particularly, to a Mg—Ti—Al composite metal hydroxide.

BACKGROUND

With development of advanced synthetic chemical technologies, polymer materials are broadly used in medical products including textiles and other various commonly used products such as a flame-retardant agent, etc. However, among polymer materials commercially available in the art, in particular, polyolefin resin, halogenated resin and polyimide resin are unstable with respect to heat or light and, in a case where they are molten through heating or used at a high temperature during a molding process, thermal degradation or quality deterioration may be caused. Due to this, a final product may encounter disadvantages such as coloring problems, modification of characteristics, deterioration in mechanical properties, or the like.

Accordingly, in order to endow heat resistant stability to the resin formed product, heavy metal fatty acids such as Pb, Cd, etc., Sn materials and/or Ba materials have been used alone or in combination with two or more thereof. However, since the toxicity of such a stabilizer has recently become a social and/or environmental problem, Sn-based and Ca—Zn based stabilizing agents are being intensively developed. However, such stabilizing agents also entail problems, for example, toxicity problems. In order to improve the above problems, some have proposed techniques using a composite metal hydroxide such as Mg—Al hydrotalcite, Li—Al hydrotalcite, etc.

Hydrotalcite is a natural mineral discovered in 1842 and was reproduced by synthesis in a laboratory by Feiknecht in 1930 which is 100 years after a general structure thereof was disclosed. A layered composite metal hydroxide, known as a layered double hydroxide (LDH) or layered mixture metal hydroxide, including an anionic layer, is a two-dimensional layered structure enabling a charge balance by using anions, which are exchangeable with a positively charged ionic layer including two kinds of cations, wherein the anionic layer and can be exchanged with a variety of organic/inorganic ions.

Such a layered composite metal hydroxide is commercially synthesized with a high purity and applied to a wide range of applications, for example, an environmental pollution remover, a catalyst inactivating agent, an acid scavenger, an acid adsorbent, a flame retardant, a flame-retardant assistant, a heat-resistant stability enhancer for polymers, an acid-neutralizing agent, a UV ray protector, a heat preservation agent, and so forth.

Preparation of the layered composite metal hydroxide may be generally classified into co-precipitation using an aqueous metal salt and hydrothermal synthesis using a poor water-soluble metal hydrate to conduct synthesis at a high temperature.

U.S. Pat. No. 3,879,523 discloses a method for synthesis of a layered composite metal hydroxide having a hydrotalcite structure by using a variety of mixed metal components and anion providing materials, which is a process to synthesize the above material through co-precipitation using a water soluble metal salt, thus requiring excess washing water in a reaction process and causing a problem of generating by-products in large quantities.

Meanwhile, U.S. Pat. No. 4,458,026 discloses a method for synthesis of a hydrotalcite type catalyst, which includes: adding a solution containing a bivalent metal inorganic salt such as magnesium nitrate and a trivalent metal inorganic salt such as aluminum nitrate mixed together to another solution containing sodium hydroxide and sodium carbonate, as an anion providing material, combined in a stoichiometric ratio thereof; reacting the mixture to synthesize a hydrotalcite slurry; thereafter, filtering and washing the slurry, and heating and drying the same at a temperature of about 300 to 600° C. The method described in the above US patent has a problem of consuming a considerable amount of heat during processing.

Alternatively, U.S. Pat. No. 4,904,457 discloses a method for synthesis of hydrotalcite at a high yield of 75% or more, which includes: heating a magnesium compound such as magnesium carbonate or magnesium hydroxide at a high temperature to activate the same; and reacting the activated magnesium in a solution containing hydroxyl group ions as well as an aluminum salt and a carbonate salt in a pH range of more than 13. However, the process proposed in the above US Patent not only consumes excess energy but also requires a reaction under an alkaline compound condition, thus causing a significant decrease in a thermal stability efficiency of the finally produced hydrotalcite.

Meanwhile, Korean Patent Laid-Open No. 2001-0108920 discloses a method for synthesis of a layered composite metal hydroxide in a hydrotalcite form, which includes: dispersing a crystalline metal hydroxide mixture in water; mixing the dispersion with a water-soluble metal hydroxide mixture, an interlayer anion providing material and a solution containing alkali-metal hydroxide; thereafter, synthesizing a hydrotalcite type layered composite hydroxide under high temperature/high pressure conditions. Although the above Korean published Patent describes that using advantages/disadvantage of both co-precipitation and hydrothermal synthesis can control physical/chemical properties of the layered composite metal hydroxide after final production thereof, a water-soluble metal hydroxide in excess is used and causes by-products in large quantities and a reaction at a high pH, thus causing disadvantages such as water pollution and requirement of excessive washing.

Alternatively, Korean Patent Laid-Open No. 2000-0049194 discloses a method for synthesis of a composite metal hydroxide containing lithium metal as a stabilizer for a halogen-containing resin. However, since three different metals as well as lithium as an expensive metal are used, economical effects are decreased.

In addition, when a Mg—Al laminated structure includes other impurities, crystallinity is generally reduced to cause a deterioration in performance (see Microporous and Mesoporous Materials 111 (2008) pp. 12-17).

SUMMARY

Accordingly, the present invention has been proposed to overcome conventional problems as described above, and an object of the present invention is to provide a metal composite hydroxide and a production method thereof, which includes: ultrasound processing to inhibit initial coloring as well as deterioration when added to a polymer, thereby providing excellent heat resistance and transparency, and superior performance of capturing any inorganic/organic compounds, especially, halogen in a solution. Raw materials used herein have economic merits and allow a metal composite hydroxide capable of solving environmental problems such as water pollution, as well as a method for production of the above material.

The above objects and other objects and/or characteristics of the present invention will be successfully achieved according to the following description.

The invention relates to a preparation method thereof which includes an ultrasound process of a solution containing a magnesium salt and a titanium salt in relative ratios of metal elements comprised in the above Mg—Ti—Al composite hydroxide, thereby giving advantageous effects such as excellent crystallinity and, when added to a polymer, prevention of degradation and early-staining properties while transparency thereof is outstanding:

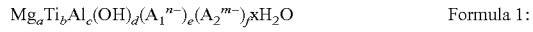

Formula 1:

wherein $A_1^{n-}$ and $A_1^{m-}$ are respectively anions having valences of n and m, a/c ranges from 1 to 5, and b, c, d and x are numbers satisfying the conditions of $0<b<5$, $0<c<5$, $0<d$ and $0 \le x<5$, while e and f are numbers satisfying the condition of $1 \le ne+mf \le 5$. In order to accomplish the foregoing objects, the present invention provides a Mg—Ti—Al composite metal hydroxide represented by Formula 1 below:

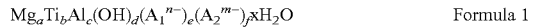

Formula 1 wherein $A_1^{n-}$ and $A_2^{m-}$ are respectively anions having valences of n and m, a/c ranges from 1 to 5, and b, c, d and x are numbers satisfying the conditions of $0<b \le 5$, $0<c \le 5$, $0<d$ and $0 \le x<5$, while e and f are numbers satisfying the condition of $1 \le ne+mf \le 5$.

Also, the present invention provides a method for preparation of a Mg—Ti—Al composite metal hydroxide having a laminated structure represented by Formula 1, including: (a) subjecting a mixed solution of a magnesium salt and a titanium salt in a solvent to ultrasonic processing; (b) preparing a solution mixture of an aluminum salt, a pH regulator and an anionic solution; (c) adding the mixed solution of step (a) to the solution mixture of step (b) and reacting a mixture thereof under high temperature/high pressure conditions; (d) filtering and washing a slurry obtained from step (c) to remove the solvent, dispersing the same in water and adding the anionic solution thereto to conduct a reaction; (e) filtering and washing a product resulting from step (d) and conducting surface treatment thereof; and (f) filtering, washing and drying a resultant product of step (e) to provide particles.

Novel Mg—Ti—Al composite metal hydroxide particles according to the present invention may capture a trace amount of halogen contained in different resins and exhibit excellent effects to inhibit deterioration and initial coloring, transparency, or the like. In addition, the Mg—Ti—Al composite metal hydroxide particles according to the present invention are not originally dissolved, instead, may maximally function to capture an anionic organic/inorganic compound, as a powder form or a molded product, from the solution.

BRIEF DESCRIPTION OF THE DRAWINGS

The above and other objects, features and other advantages of the present invention will be more clearly understood from the following detailed description taken in conjunction with the accompanying drawings, in which:

FIG. 3 is graphs illustrating measured results of heat resistance of respective polymers of the composite metal hydroxides, each having a laminated structure, according to Comparative Examples 1, 2, and 3 and Examples 1 and 2, respectively;

FIG. 5 is graphs illustrating measured results of respective polymers of the composite metal hydroxides, each having a laminated structure, according to Examples 8, 9, 10, 11 and 12, respectively;

FIG. 6 is graphs illustrating assessment results of press characteristics of respective polymers of the composite metal hydroxides, each having a laminated structure, according to Comparative Examples 1, 2 and 3, and Example 1, respectively;

FIG. 7 is graphs illustrating assessment results of press characteristics of respective polymers of the composite metal hydroxides, each having a laminated structure, according to Examples 1, 2, 3 and 4, respectively;

FIG. 9 is graphs illustrating assessment results of press characteristics of respective polymers of the composite metal hydroxides, each having a laminated structure, according to Examples 9, 10, 11 and 12, respectively.

DETAILED DESCRIPTION

As described above by the present inventors, if individual raw materials are mixed and subjected to ultrasonic processing under predetermined conditions, synthesis of Mg—Ti—Al composite metal hydroxide particles having a laminated structure represented by Formula 1 below may be possible:

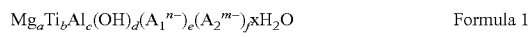

Formula 1 wherein $A_1^{n-}$ and $A_2^{m-}$ are respectively anions having valances of n and m, a/c ranges from 1 to 5, and b, c, d and x are numbers satisfying the conditions of $0<b \le 5$, $0<c \le 5$, $0<d$ and $0 \le x<5$, while e and f are numbers satisfying the condition of $1 \le ne+mf \le 5$.

In the above Formula 1, $A_1^{n-}$ and $A_2^{m-}$ are at least one selected from a group consisting of F−, Cl−, Br−, $NO_3^-$, OH−, $CO_3^{2-}$, $HPO_4^{2-}$, $HPO_3^{2-}$, $PO_3^{3-}$, $SO_4^{2-}$, $SO_3^{2-}$, $S_2O_3^-$, $H_2BO_3^-$, $SiO_3^{2-}$, $HSiO^{3-}$, $HSi_2O_5^-$, $Si_2O_5^{2-}$, $CrO_4^{2-}$ and $Cr_2O_7^{2-}$. $A_1^{n-}$ is preferably a silicic acid ion including $SiO_3^{2-}$, $HSiO^{3-}$, $Si_2O_5^{2-}$ or $HSi_2O_5^-$, while $A_2^{m-}$ may be $CO_3^{2-}$, $SO_4^{2-}$, $NO^{3-}$, $Cl^-$ or $OH^-$.

The method of preparing the Mg—Ti—Al composite metal hydroxide represented by Formula 1 is characterized by including: (a) subjecting a mixed solution of a magnesium salt and a titanium salt in a solvent to ultrasonic processing; (b) preparing a solution mixture of an aluminum salt, a pH regulator and an anionic solution; (c) adding the mixed solution of step (a) to the solution mixture of step (b) and reacting a mixture thereof under high temperature/high pressure conditions; (d) filtering and washing a slurry obtained from step (c) to remove the solvent, dispersing the same in water and adding the anionic solution thereto to conduct a reaction; (e) filtering and washing a product resulting from step (d) and conducting surface treatment thereof; and (f) filtering, washing and drying a resultant product of step (e) to provide particles.

In steps (d), (e) and (f), filtering and washing may be repeatedly carried our several times, or an additional filtering-washing-filtering process may be further executed after the surface treatment in step (e).

Figure 1:
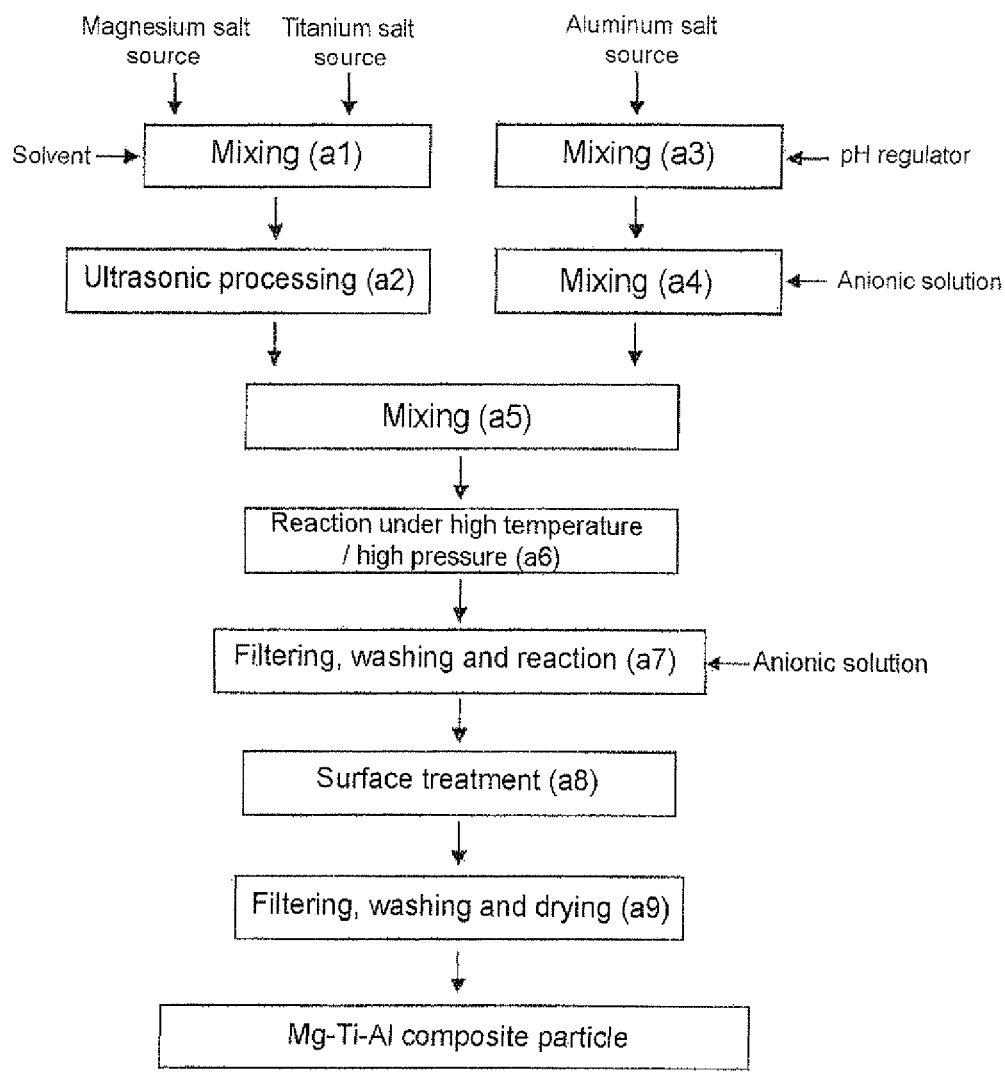
FIG. 1 is a flow chart schematically illustrating a process of synthesizing a Mg—Ti—Al composite metal hydroxide having a laminated structure according to the present invention.

More particularly, as shown in FIG. 1, the inventive method of preparing the Mg—Ti—Al composite metal hydroxide may include: (a1) mixing a magnesium salt source and a titanium salt source with a solvent to synthesize a mixed solution; (a2) subjecting the mixed solution to ultrasonic processing; (a3) mixing an aluminum salt source with a pH regulator and heating the same to synthesize a solution containing the aluminum salt dissolved therein; (a4) adding an anion solution to the solution in heated state of step (a3) to synthesize a solution mixture; (a5) adding the solution of step (a2) to the solution in heated state of step (a4) to synthesize a solution mixture; (a6) reacting the solution of step (a5) under high temperature/high pressure conditions; (a7) filtering and washing a slurry resulting from step (a6) to remove the solvent, dispersing the slurry in water, and adding an anionic solution thereto, in order to conduct a reaction; (a8) filtering and washing the resultant product of step (a7) to remove the solvent and conducting surface treatment thereof; and (a9) repeatedly filtering and washing the above solution to remove the solvent and drying a resultant product to provide Mg—Ti—Al composite metal hydroxide particles having a laminated structure and being represented by Formula 1.

After the solution, containing a magnesium salt and a titanium salt in relative ratios of metal elements comprised in desired Mg—Ti—Al composite metal hydroxide particles, is subjected to ultrasonic processing, the processed solution is mixed with a solution mixture including an aluminum salt, a pH regulator and an anionic solution, and then reacted at a temperature of 150 to 220° C. and a pressure of 5 to 15 kg·f/cm², that is, under high temperature/high pressure conditions, for 1 to 8 hours to synthesize Mg—Ti—Al composite metal hydroxide particles, followed by filtering, washing, surface treating and drying the particles, thereby giving a Mg—Ti—Al composite metal hydroxide powder.

Hereinafter, synthesis of the Mg—Ti—Al composite metal hydroxide according to the present invention will be described in detail.

Ultrasonic Processing of Magnesium Salt/titanium Salt Mixed Solution

After mixing the magnesium salt with the titanium salt, the mixture is subjected to ultrasonic processing. This is an important means in synthesizing Mg—Ti—Al composite metal hydroxide particles. When ultrasonic irradiation is applied to a liquid, ultrasonic cavitation occurs. Such ultrasonic cavitation is substantially associated with formation, growth and implosive collapse of bubbles. Also, the ultrasonic cavitation may lead to different physical and/or chemical influences such as a high temperature (>5000 K), a high pressure (>20 MPa), a rapid cooling rate (>1010 Ks$^{-1}$), and the like. Therefore, it may provide specific environments in which a chemical reaction is executed under very extreme conditions. For the ultrasonic processing, it is preferable to establish an ultrasonic frequency in a range of 10 to 50 kHz, a power in a range of 100 to 1500 W, and a temperature of not more than 100° C. In addition, a time for the ultrasonic processing may range from 1 to 10 hours, and preferably, 2 to 4 hours. If the ultrasonic processing is conducted for less than 1 hour, irregular ultrasonic cavitation may occur. On the other hand, when the time for the ultrasonic processing exceeds 10 hours, magnesium and titanium hydroxides are respectively generated to cause an agglomeration of particles and, in turn, a rapid increase in a size of the particles. Accordingly, in order to uniformly generate and align the particles, the ultrasonic processing is preferably conducted for 1 to 10 hours.

The magnesium salt referred herein may include at least one selected from a group consisting of, for example, magnesium hydroxide, magnesium acetate, magnesium bromide, magnesium carbonate, magnesium chloride, magnesium fluoride, magnesium nitrate, magnesium perchlorate, magnesium phosphate, or magnesium sulfate, which are used alone or in combination with two or more thereof, but not be limited thereto.

The titanium salt referred herein may include at least one selected from, for example, titanium(IV) n-butoxide, titanium tetrachloride, titanium(IV) ethoxide, titanium(IV) isopropoxide, titanium(IV) sulfate, titanium(IV) propoxide or titanium hydroxide, which are used alone or in combination with two or more thereof, but not be limited thereto.

The solvent for synthesizing a solution mixture may be used without water or may be an alcohol-based organic solvent which has a high boiling point thus is desirably used without a loss of solution, even in a reaction at a high temperature. Such an alcohol-based organic solvent may include bivalent, trivalent or polyvalent aliphatic alcohols, for example, methanol, ethanol, propanol, isopropanol, butanol, isobutanol, 3-methyl-3-methoxy butanol, tridecyl alcohol, pentanol, ethyleneglycol, polyethyleneglycol, dipropyleneglycol, hexyleneglycol, butyleneglycol, sucrose, sorbitol, glycerin, and so forth.

Preparation of Solution Mixture Including Aluminum Salt, pH Regulator and Anionic Solution The aluminum salt referred herein may include, for example, aluminum hydroxide, aluminum acetate, aluminum chloride, aluminum fluoride, aluminum isopropoxide, aluminum nitrate, aluminum phosphate, aluminum sulfate, etc., which are used alone or in combination with two or more thereof, but not be limited thereto.

The pH regulator referred herein may include an acidic solution and an alkaline solution, which is preferably used to regulate to a pH value of 7 to 11, more preferably, to a pH value of 8 to 10. The acidic solution is preferably nitric acid or hydrochloric acid, while the alkaline solution may include, for example, ammonia water, sodium hydroxide, calcium hydroxide, etc. The pH regulator may be the acidic solution, the alkaline solution, or a mixture of the acidic solution and the alkaline solution, wherein the acidic solution and the alkaline solution may be used alone or in combination with two kinds or more thereof.

The interlayer anionic material is an anionic component to form both upper and lower faces between a mixed metal component in the Mg—Ti—Al composite particle represented by Formula 1 below, and may include, for example, $F^-$, $Cl^-$, $Br^-$, $NO_3^-$, $CO_3^{2-}$, $HPO_4^{2-}$, $HPO_3^{2-}$, $PO_3^{3-}$, $SO_4^{2-}$, $SO_3^{2-}$, $S_2O_3^-$, $H_2BO_3^-$, $SiO_3^{2-}$, $HSi_2O_5^-$, $Si_2O_5^{2-}$, $CrO_4^{2-}$, $Cr_2O_7^{2-}$, or the like. Particular examples of a silicon compound, a boron compound and/or an aluminum compound may include sodium meta-silicate, sodium ortho-silicate, sodium silicate such as water glass No. 1, 2 or 3, lithium silicate, potassium meta-silicate, potassium ortho-silicate, sodium tetraborate, sodium meta-borate, sodium ortho-aluminate, calcium ortho-aluminate, sodium meta-aluminate, potassium meta-aluminate, aluminum chloride, aluminum nitrate, aluminum sulfate, aluminum phosphate, or the like. The interlayer anion may be used alone or in combination with two kinds or more thereof. Among the anionic solution described above, cations responding to the anion may include, for example, hydrogen ion, alkali-metal ions such as $Na^+$, $K^+$, etc., and alkali-earth metal ions such as $Mg^{2+}$, $Ca^{2+}$, etc., however, not being limited thereto.

High Temperature/High Pressure Reaction

To a solution mixture of an aluminum salt, a pH regulator and an anionic solution, a mixed solution of magnesium/titanium is added, followed by proceeding a reaction at a temperature of 120 to 250° C. at a pressure of 2 to 20 kg·f/cm$^2$, for 1 to 24 hours. Preferably, the reaction is conducted for 2 to 8 hours. If the reaction temperature is less than 120° C. and the pressure is less than 2 kg·f/cm$^2$, Mg—Ti—Al composite metal hydroxide particles is slowly proceeded to thus increase a reaction time. On the other hand, when the reaction temperature is more than 250° C. and the pressure is more than 20 kg·f/cm$^2$, Mg—Ti—Al composite metal hydroxide particles have reduced particle size and become micro-particles, hence causing agglomeration of particles and requiring high-cost equipment for mass production of products.

Filtering, Washing and Surface Treatment

After the high temperature/high pressure reaction, the product is filtered and washed to remove the solvent, re-dispersed in water, followed by surface treatment and drying the product.

The surface treatment is a process to inhibit deterioration of Mg—Ti—Al composite metal hydroxide particles themselves by halogen, which occurs during processing when the Mg—Ti—Al composite metal particles are used in a polymer, and to improve dispersibility of the particles, and the surface treatment is executed at 60 to 130° C. for 1 to 4 hours.

With regard to the surface treatment and/or coating treatment of the present invention, a surface treatment agent may include, for example, fatty acid, fatty acid salts, metal alkoxide, a silane coupling agent or mixtures thereof. Herein, the fatty acid is an acid including a linear or branched hydrocarbon group having 10 to 30 carbon atoms and may include saturated or unsaturated fatty acid such as capric acid, lauric acid, myristic acid, palmitic acid, stearic acid, oleic acid, linoleic acid, linolenic acid, eicosanoic acid, arachidonic acid, erucic acid, 7, 10, 13, 16, 19-docosapentaenoic acid, etc., and fatty acid metal salts such as zinc stearate, calcium stearate, sodium stearate, sodium oleate, zinc oleate, zinc palmitate, etc.

Meanwhile, metal alkoxide may include metal alkoxides such as tetramethoxy silane, tetraethoxy silane, tetrapropoxy silane, tetrabutoxy silane, titanium tetraethoxide, titanium tetrapropoxide, titanium tetrabutoxide, zirconium tetraethoxide, zirconium tetrapropoxide, zirconium tetrabutoxide, aluminum triethoxide, aluminum tripropoxide, aluminum tributoxide, or the like.

The silane coupling agent may be at least one selected from a group consisting of 3-methacryloxypropyl trimethoxysilane, 3-methacryloxypropyl triethoxysilane, vinyltrimethoxysilane, vinyltriethoxysilane, vinyltris(2-methoxy-ethoxy)-silane, 2-(acryloxyethoxy)trimethylsilane, N-(3-acryloxy-2-hydroxypropyl)-3-amionpropyl triethoxysilane, N-(3-acryloxypropyl)dimethylmethoxysilane, (3-acryloxypropyl) methyl bis-(trimethylsyloxy)silane, (3-acryloxypropyl) methyldimethoxysilane, 3-(N-arylamino)propyl trimethoxysilane, allyldimethoxysilane, allyltriethoxysilane, butenyltriethoxysilane, 2-(chloromethyl)allyltrimethoxysilane, [2-(3-cyclohexenyl)ethyl]trimethoxysilane, 5-(bicycloheptenyl)triethoxysilane, (3-cyclopentadienylpropyl)triethoxysilane, 1,1-diethoxy-1-siryl acrylopen-3-en, (furfuryloxymethyl)triethoxysilahe, O-(methacryloxyethyl)-N-(triethoxysilylpropyl)urethane, N-(3-methacryloyl-2-hydroxypropyl)-3-aminopropyl triethoxysilane, (methacryloxymethyl)bis(trimethylsyloxy)methylsilane, (methacryloxymethyl)dimethylethoxysilane, methacryloxymethyl triethoxysilane, methacryloxymethyl trimethoxysilane, 3-methacryloxypropyl bis(trimethylsyloxy)methylsilane, methacryloxypropyldimethylethoxysilane, methacryloxypropyl dimethylmethoxysilane, methacryloxypropylmethyl diethoxysilane, methacryloxypropylmethyl dimethoxysilane, (3-acryloxypropyl)trimethoxysilane, methacryloxypropyl tris(methoxyethoxy)silane, methacryloxypropyl tris(vinyldimethoxysiloxy)silane, 3-(N-styrylmethyl-2-aminoethylamino)-propyltrimethoxysilane, 3-aminopropyl trimethoxysilane, 3-aminopropyl triethoxysilane, N-2-(aminoethyl)-3-aminopropyl trimethoxysilane, N-2-(aminoethyl)-3-aminopropyl methyldimethoxysilane, N-2-(aminoethyl)-3-aminopropyl triethoxysilane, 3-triethoxysiryl-N-(1,3-dimethyl-butylidene)propylamine, N-phenyl-3-aminopropyl trimethoxysilane, N-(vinylbenzyl)-2-aminoethyl-3-aminopropyl trimethoxysilane hydrochloride, 3-ureidopropyl triethoxysilane, 3-chloropropyl trimethoxysilane, 3-glycidyloxypropyl trimethoxysilane, 3-glycidyloxypropyl triethoxysilane, 3-glycidoxypropylmethyl diethoxysilane, 3-mercaptopropyl trimethoxysilane, 3-mercaptopropyl triethoxysilane, 3-mercaptopropylmethyl dimethoxysilane, bis(triethoxysilylpropyl)tetrasulfide, 3-isocyanatopropyl triethoxysilane, 3-isocyanatopropyl trimethoxysilane, dimethyl dimethoxysilane, dimethyl diethoxysilane, 3-aminopropylmethyl diethoxysilane and 2-(3,4-epoxycyclohexyl)ethyltrimethoxysilane. The surface treatment agent may be used alone or in combination with two kinds or more thereof. An added amount of the surface treatment agent may range from 0.1 to 10 wt. %, preferably, 0.5 to 5 wt. %. If the amount is less than 0.1 wt. %, dispersibility is not favorable. When the amount exceeds 10 wt. %, side effects and economic disadvantages may be caused by unreacted surface treatment agent.

Hereinafter, the present invention will be described in detail by the following examples, however, these examples are given for illustration and the present invention is not particularly limited to the examples.

EXAMPLE

In order to synthesize Mg—Ti—Al composite metal hydroxide particles having a laminated structure according to the present invention, an ultrasonic (processing) apparatus having an ultrasonic generator equipped with a Ti horn, a reactor, a constant-temperature bath, and a heater was installed.

The ultrasonic apparatus used in the present invention was an apparatus manufactured by SONIC & MATERIAL Co. (model name: VCX 1500), and a reaction was proceeded with a set frequency of 20 kHz and a fixed output of 1000 W. Moreover, a constant-temperature bath was used to maintain a constant temperature.

Example 1

In order to mix raw materials, 1.5 kg of water was put into a reactor, 4 moles of magnesium chloride and 0.1 mole of titanium tetrachloride were added to the reactor, and the mixture was stirred for 20 minutes and subjected to ultrasonic processing at 40° C. for 1 hour, followed by natural cooling. Next, after adding 2 moles of aluminum hydroxide and 5.5 moles of sodium hydroxide to 1.0 kg of water, the mixture was heated and dissolved and mixed with 1.5 moles of sodium carbonate to prepare a solution mixture. A magnesium/titanium solution was added to the prepared solution mixture and this prepared product was subjected to a reaction at high temperature/high pressure for 4 hours while maintaining a temperature of 170° C. and a pressure of 6.5 kg·f/cm². After completing the reaction, filtering and washing were repeated and a resultant slurry thereof was dispersed in 3.0 kg of water to form a material at 90° C. Then, after agitating the formed material with sodium silicate No. 3 (0.1 mole of SiO₂) placed around the material for 2 hours, filtering and washing were repeated, The resultant product was separated and re-dispersed in 3.0 kg of water, followed by surface treatment using sodium stearate at 95° C. After completing the surface treatment, the treated product was filtered and washed further one time with a small amount of water. After filtering the same again, the product was dried at a temperature of not more than 150° C., thereby providing synthesized Mg—Ti—Al composite metal hydroxide particles having a laminated structure.

From analysis results of the hydroxides described above, an empirical formula was practically represented by:

$$Mg_{4.01}Ti_{0.09}Al_{1.99}(OH)_{12}(SiO_3)_{0.03}(CO_3)_{1.16}\cdot 2.8H_2O$$

Example 2

The same procedures as described in Example 1 were repeated, except that 0.6 mole of titanium tetrachloride, 1.5 moles of aluminum hydroxide and 6.5 moles of sodium hydroxide were used instead of 0.1 mole of titanium tetrachloride, 2 moles of aluminum hydroxide and 5.5 moles of sodium hydroxide.

From analysis results of the hydroxides described above, an empirical formula was practically represented by:

$$Mg_{3.98}Ti_{0.61}Al_{1.48}(OH)_{12}(SiO_3)_{0.03}(CO_3)_{1.19}\cdot 2.8H_2O$$

Example 3

The same procedures as described in Example 1 were repeated, except that 1.1 moles of titanium tetrachloride, 1 mole of aluminum hydroxide and 7.5 moles of sodium hydroxide were used instead of 0.1 mole of titanium tetrachloride, 2 moles of aluminum hydroxide and 5.5 moles of sodium hydroxide.

From analysis results of the hydroxides described above, an empirical formula was practically represented by:

$$Mg_{4.03}Ti_{0.93}Al_{1.05}(OH)_{12}(SiO_3)_{0.03}(CO_3)_{1.23}\cdot 2.7H_2O$$

Example 4

The same procedures as described in Example 1 were repeated, except that potassium phosphate was used instead of sodium silicate No. 3, and 1.0 mole of sodium carbonate and 1.0 mole of sodium sulfate were used instead of 1.5 moles of sodium carbonate.

From analysis results of the hydroxides described above, an empirical formula was practically represented by:

$$Mg_{4.01}Ti_{0.09}Al_{1.99}(OH)_{12}(PO_4)_{0.08}(CO_3)_{1.08}\cdot 2.9H_2O$$

Example 5

The same procedures as described in Example 1 were repeated, except that 1.0 mole of sodium sulfate was used instead of sodium silicate No. 3 (SiO₂, 1 mole).

From analysis results of the hydroxides described above, an empirical formula was practically represented by:

$$Mg_{3.97}Ti_{0.08}Al_{1.98}(OH)_{12}(SO_4)_{0.82}(CO_3)_{0.92}\cdot 2.7H_2O$$

Example 6

The same procedures as described in Example 1 were repeated, except that 1.0 L of ethanol was fed to the reactor instead of 1.5 kg of water and then 4 moles of magnesium chloride and 0.1 mole of titanium tetrachloride were added to the reactor.

From analysis results of the hydroxides described above, an empirical formula was practically represented by:

$$Mg_{4.01}Ti_{0.09}Al_{1.99}(OH)_{12}(SiO_3)_{0.03}(CO_3)_{1.16}\cdot 2.8H_2O$$

Example 7

The same procedures as described in Example 1 were repeated, except that 0.5 kg of water and 0.7 L of ethanol was fed to the reactor instead of 1.5 kg of water and then 4 moles of magnesium chloride and 0.1 mole of titanium tetrachloride were added to the reactor.

From analysis results of the hydroxides described above, an empirical formula was practically represented by:

$$Mg_{4.01}Ti_{0.09}Al_{1.99}(OH)_{12}(SiO_3)_{0.03}(CO_3)_{1.16}\cdot 2.8H_2O$$

Example 8

The same procedures as described in Example 1 were repeated, except that 1.0 L of propanol was fed to the reactor instead of 1.5 kg of water and then 4 moles of magnesium chloride and 0.1 mole of titanium tetrachloride were added to the reactor.

From analysis results of the hydroxides described above, an empirical formula was practically represented by:

$$Mg_{4.01}Ti_{0.09}Al_{1.99}(OH)_{12}(SiO_3)_{0.03}(CO_3)_{1.16}\cdot 2.8H_2O$$

Example 9

The same procedures as described in Example 1 were repeated, except that magnesium chloride was altered into magnesium nitrate, and aluminum hydroxide was altered into aluminum nitrate.

From analysis results of the hydroxides described above, an empirical formula was practically represented by:

$$Mg_{4.01}Ti_{0.09}Al_{1.99}(OH)_{12}(SiO_3)_{0.03}(CO_3)_{1.16}\cdot 2.8H_2O$$

Example 10

The same procedures as described in Example 1 were repeated, except that titanium tetrachloride was altered into titanium sulfate.

From analysis results of the hydroxides described above, an empirical formula was practically represented by:

$$Mg_{4.01}Ti_{0.09}Al_{1.99}(OH)_{12}(SiO_3)_{0.03}(CO_3)_{1.16}\cdot 2.8H_2O$$

Example 11

The same procedures as described in Example 1 were repeated, except that sodium hydroxide was altered into ammonia water.

From analysis results of the hydroxides described above, an empirical formula was practically represented by:

$$Mg_{4.01}Ti_{0.09}Al_{1.99}(OH)_{12}(SiO_3)_{0.03}(CO_3)_{1.16}\cdot 2.8H_2O$$

Example 12

The same procedures as described in Example 1 were repeated, except that the temperature of 200° C. and the pressure of 12 kg·f/cm² were maintained instead of the temperature of 170° C. and the pressure of 6.5 kg·f/cm², respectively.

From analysis results of the hydroxides described above, an empirical formula was practically represented by:

$$Mg_{4.01}Ti_{0.09}Al_{1.99}(OH)_{12}(SiO_3)_{0.03}(CO_3)_{1.16}\cdot 2.8H_2O$$

Comparative Example 1

The same procedures as described in Example 1 were repeated, except that the ultrasonic processing was omitted.

From analysis results of the hydroxides described above, an empirical formula was practically represented by:

$$Mg_{4.01}Ti_{0.09}Al_{1.99}(OH)_{12}(SiO_3)_{0.03}(CO_3)_{1.16}\cdot 2.8H_2O$$

Comparative Example 2

The present example was performed by using MAGCELER, which is commercially available in the market (Kyowa Chemical Industry Co., Ltd., $Mg_4Al_2(OH)_{12}(CO_3)\cdot 3H_2O$).

Comparative Example 3

The present example was performed by using NAOX-33, which is commercially available in the market (TODA KOGYO CORPORATION, $Mg_4Al_2(OH)_{12}(CO_3)\cdot 3H_2O$).

Experimental Example

Determination of Thermal Stability

Heat Resistance

The present experimental example was executed to determine thermal stability effects on chlorine-containing resins (PVC resin) of Mg—Ti—Al composite metal hydroxide particles synthesized in Examples 1 to 12, as compared to those in Comparative Examples 1 to 3. For thermal stability of resins, mixing ratios of constitutional materials used in Examples 1, Comparative Examples 1 to 3, respectively are shown as follows. Ingredients of a composition are given by a unit of parts per hundred resin (PHR).

Figure 3:
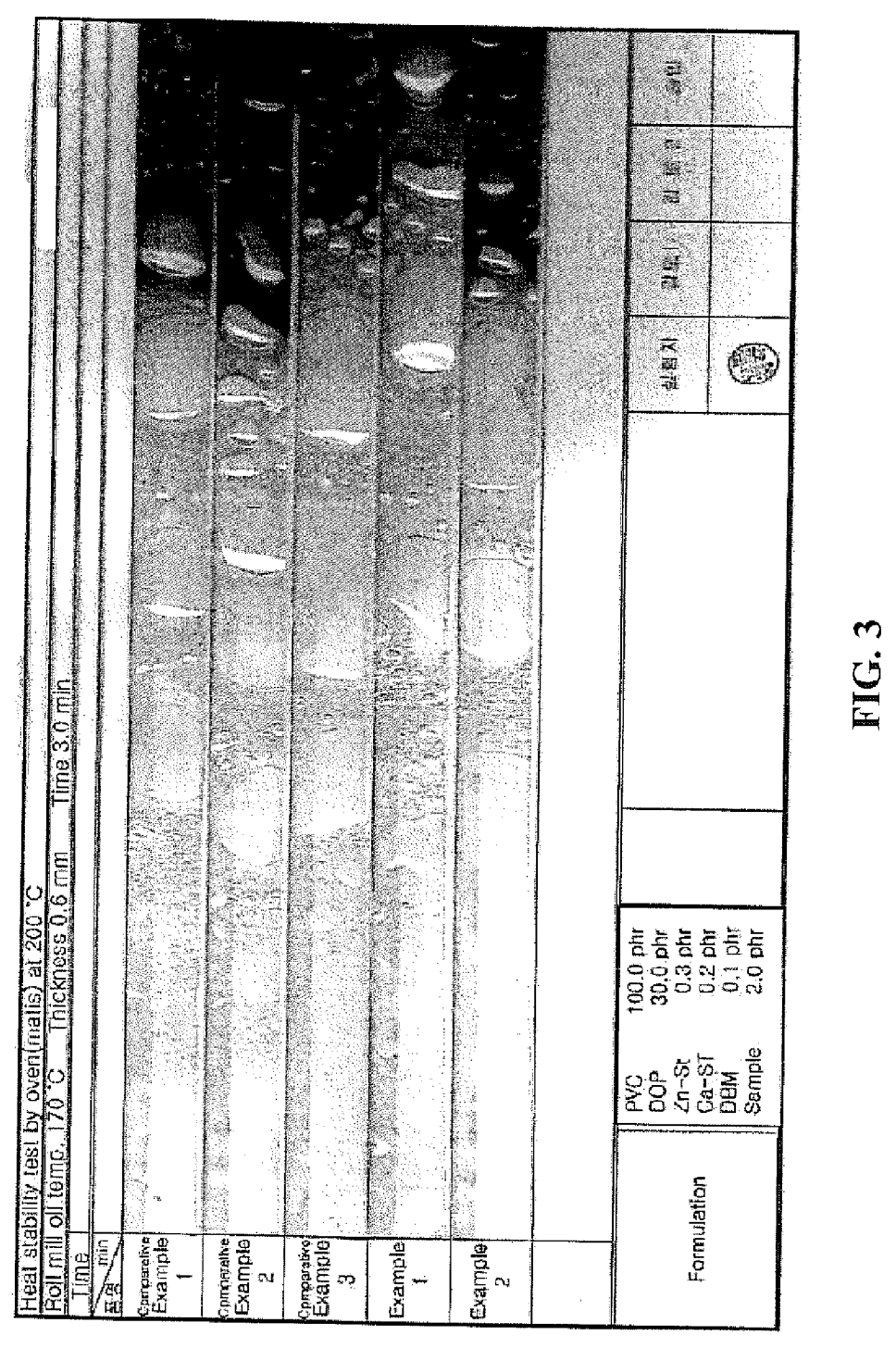
Figure 4:
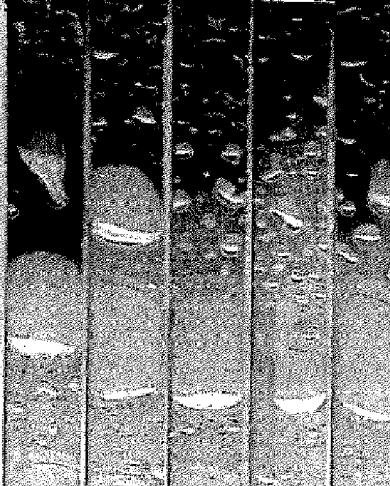
FIG. 4 is graphs illustrating measured results of heat resistance of respective polymers of the composite metal hydroxides, each having a laminated structure, according to Examples 3, 4, 5, 6 and 7, respectively.
Figure 5:
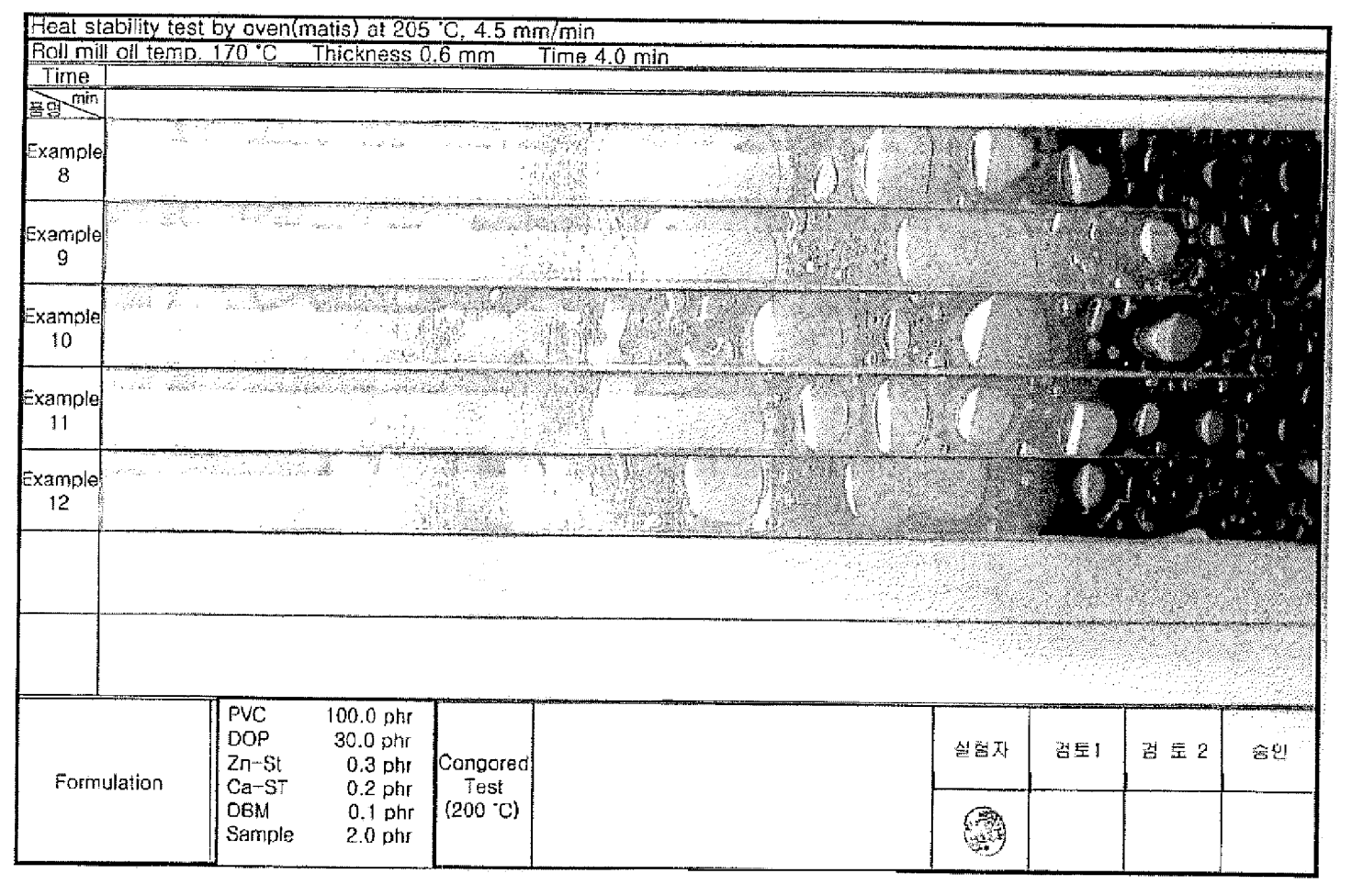
Figure 8:
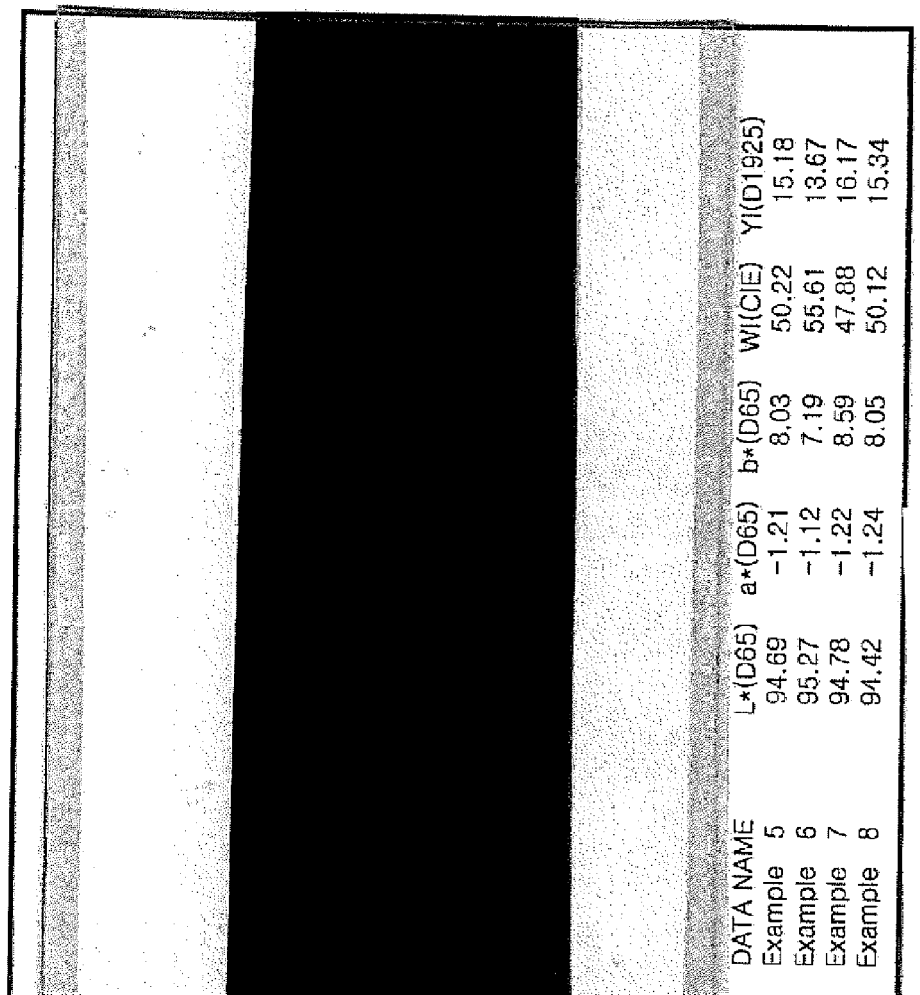
FIG. 8 is graphs illustrating assessment results of press characteristics of respective polymers of the composite metal hydroxides, each having a laminated structure, according to Examples 5, 6, 7 and 8, respectively.

PVC resin (polyvinylchloride resin, Hanwha L & C Co., Ltd.) 100 PHR
DOP (di-octyl phthalate, LG Chem., Ltd.) 25 PHR
Zn—St (zinc-stearate, Sinwon Chem., Ltd.) 0.3 PHR
Ca—St (calcium-stearate, Faci Asia Pacific Pte., Ltd.) 0.2 PHR
DEM (di-benzoylmethane, Changzhou nano chem., Ltd.) 0.1 PHR
Sample 2.0 PHR The composition including the constitutional materials in the mixing ratios described above was mixed in a roll mill (a mixing roller, Ocean Science Ltd.) at 170° C. and 90 rpm for 3 minutes, and prepared into a specimen having a thickness of 0.6 mm. After cutting the specimen into pieces having a constant size, each piece was placed in a Matis Oven (Ocean Science Ltd.) and tested and assessed under conditions of a temperature of 200° C. and 3 mm/min. Results of the assessment are illustrated in FIGS. 3 to 5.

Press Characteristics (Transparency)

After cutting a specimen into pieces having a constant size, each cut specimen having a size of 3 mm (0.6 mm×5) was placed in a heating press (Ocean Science Ltd.) and, after 30 minutes, it was measured whether discoloration had occurred or not. Such a measurement was conducted using a spectrophotometer (CM-3600, Konica Minolta Holdings, Inc.) and the measured L×(D65), a×(D65), b×(D65), WI(CIE) and YI(D1925) are illustrated in FIGS. 6 to 9.

Figure 2:
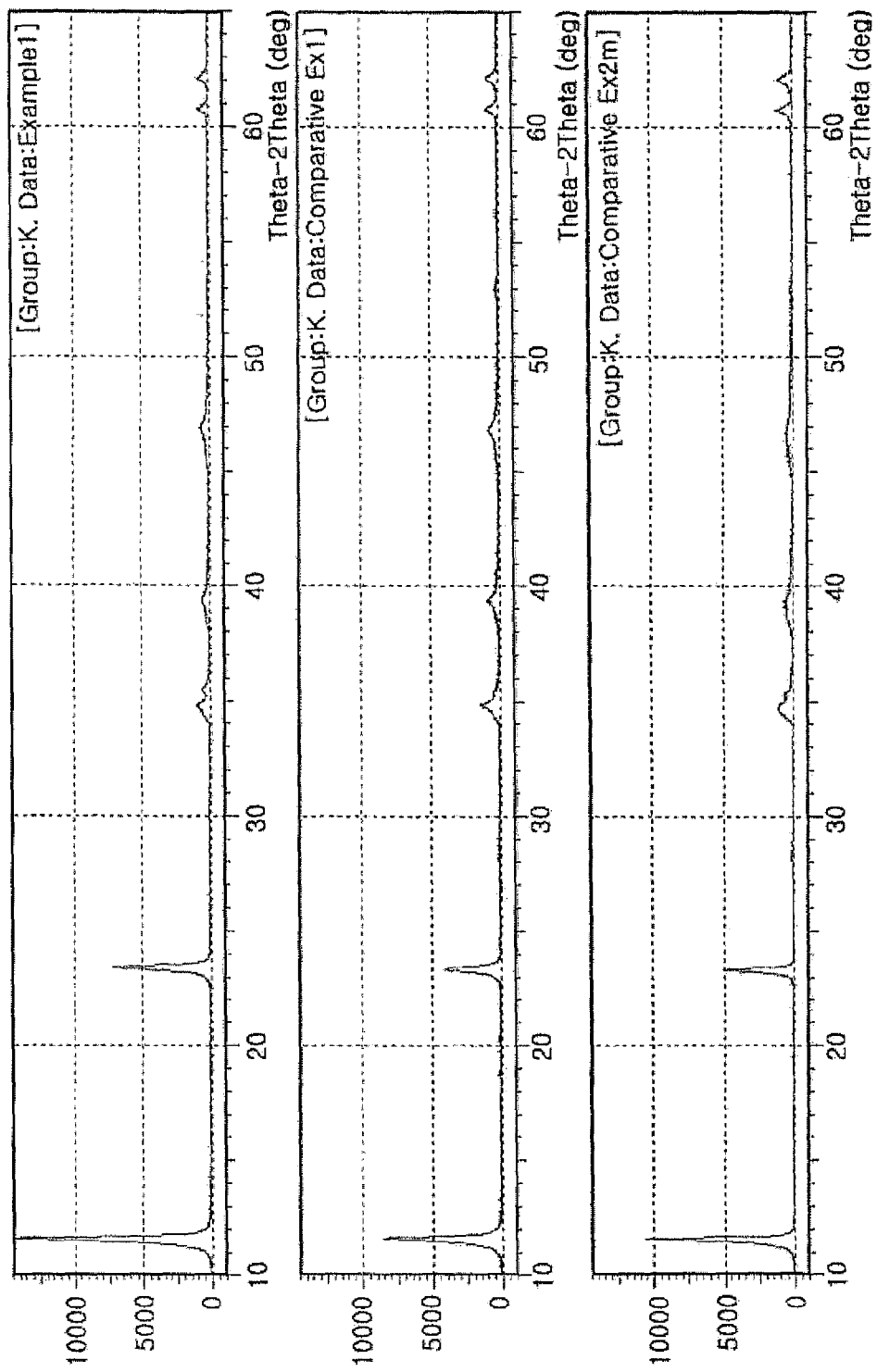
FIG. 2 is X-ray diffraction analysis graphs of the composite metal hydroxides, each having a laminated structure, according to Example 1, and Comparative Examples 1 and 2, respectively.

As shown in FIGS. 3 to 9, it can be seen that the layered composite metal hydroxide synthesized according to the examples of the present invention has improved initial coloring and a favorable carbonizing time point, in addition, excellent press characteristics such as transparency, compared to the comparative examples. It was found that Comparative Example 2 exhibited deteriorated performances in terms of initial coloring of PVC resin, a carbonizing time point and press characteristics such as transparency, compared to Example 1 of the present invention. Further, according to X-ray diffraction analysis graphs of the layered composite metal hydroxide in FIG. 2, it was demonstrated that the Mg—Ti—Al composite metal hydroxide according to Example 1 of the present invention has superior crystallinity over those in the comparative examples described above.

Although preferred embodiments of the present invention have been described in the above detailed description, the present invention is not restricted thereto. Therefore, those skilled in the art will appreciated that various variations and modification are possible in conventional production/research applications without departing from the scope and spirit of the present invention disclosed in the description, and such variations and modifications are dully within the appended claims.

The invention claimed is:

1. A Mg—Ti—Al composite metal hydroxide represented by Formula 1 below:

$$Mg_aTi_bAl_c(OH)_d(A_1^{n-})_e(A_2^{m-})_f\cdot xH_2O \quad \text{[Formula 1]}$$

wherein $A_1^{n-}$ and $A_2^{m-}$ are respectively anions having valences of n and m, a/c ranges from 1 to 5, and b, c, d and x are numbers satisfying the conditions of $0<b\leq 5$, $0<c\leq 5$, $0<d$ and $0\leq x<5$, while e and f are numbers satisfying the condition of $1\leq ne+mf\leq 5$;

wherein $A_1^{n-}$ and $A_2^{m-}$ are both present in the Mg—Ti—Al composite metal hydroxide, and are different anions from each other; and wherein neither $A_1^{n-}$ nor $A_2^{m-}$ is OH.

2. The Mg—Ti—Al composite metal hydroxide according to claim 1, wherein $A_1^{n-}$ and $A_2^{m-}$ are independently selected from the group consisting of F⁻, Cl⁻, Br⁻, $NO_3^-$, $CO_3^{2-}$, $HPO_4^{2-}$, $HPO_3^{2-}$, $PO_3^{3-}$, $SO_4^{2-}$, $SO_3^{2-}$, $S_2O_3^-$, $H_2BO_3^-$, $SiO_3^{2-}$, $HSiO_2O_5^-$, $Si_2O_5^{2-}$, $CrO_4^{2-}$, $Cr_2O_7^{2-}$, and combinations thereof.

3. A method of preparing a Mg—Ti—Al composite metal hydroxide represented by Formula 1 below, comprising:
  (a) subjecting a mixed solution of a magnesium salt and a titanium salt in a solvent to ultrasonic processing;
  (b) preparing a mixed solution of an aluminum salt, a pH regulator and an anionic solution;
  (c) adding the mixed solution of step (a) to the solution mixture of step (b) and reacting a mixture thereof under high temperature/high pressure conditions;
  (d) filtering and washing a slurry obtained from step (c) to remove the solvent, dispersing the same in water and adding the anionic solution thereto to conduct a reaction;
  (e) filtering and washing a product resulting from step (d) and conducting surface treatment thereof; and
  (f) filtering, washing and drying a resultant product of step (e) to provide particles:

$$Mg_a Ti_b Al_c (OH)_d (A_1^{n-})_e (A_2^{m-})_f \cdot xH_2O \qquad \text{[Formula 1]}$$

wherein $A_1^{n-}$ and $A_2^{m-}$ are respectively anions having valences of n and m, a/c ranges from 1 to 5, and b, c, d and x are numbers satisfying the conditions of $0<b\leq5$, $0<c\leq5$, $0<d$ and $0\leq x<5$, while e and f are numbers satisfying the condition of $1\leq ne+mf\leq5$.

4. The method according to claim 3, further comprising drying the resultant product of step (e) to obtain particles.

5. The method according to claim 3, wherein filtering and washing were repeatedly conducted in step (d), (e) or (f), or further comprising a filtering-washing-filtering process after the surface treatment in step (e).

6. The method according to any one of claims 3 to 5, wherein the magnesium salt includes at least one selected from the group consisting of magnesium hydroxide, magnesium acetate, magnesium bromide, magnesium carbonate, magnesium chloride, magnesium fluoride, magnesium nitrate, magnesium perchlorate, magnesium phosphate and magnesium sulfate.

7. The method according to any one of claims 3 to 5, wherein the titanium salt includes at least one selected from the group consisting of titanium(IV) n-butoxide, titanium tetrachloride, titanium(IV) ethoxide, titanium(IV) isopropoxide, titanium(IV) sulfate, titanium(IV) propoxide and titanium hydroxide.

8. The method according to any one of claims 3 to 5, wherein the solvent is water or an alcohol-based organic solvent.

9. The method according to claim 8, wherein the alcohol-based organic solvent is at least one selected from a group consisting of methanol, ethanol, propanol, isopropanol, butanol, isobutanol, 3-methyl-3-methoxy butanol, tridecyl alcohol, pentanol, ethylene glycol, polyethylene glycol, dipropyleneglycol, hexylene glycol, butylene glycol, sucrose, sorbitol and glycerin.

10. The method according to any one of claims 3 to 5, wherein the ultrasonic processing in step (a) is conducted with a frequency of 10 to 50 kHz by an ultrasonic power of 100 to 1500 W at 100° C. or less.

11. The method according to any one of claims 3 to 5, wherein the aluminum salt is at least one selected from the group consisting of aluminum hydroxide, aluminum acetate, aluminum chloride, aluminum fluoride, aluminum isopropoxide, aluminum nitrate, aluminum phosphate and aluminum sulfate.

12. The method according to any one of claims 3 to 5, wherein the pH regulator is at least one selected from the group consisting of nitric acid, hydrochloric acid, ammonia water, sodium hydroxide and calcium hydroxide.

13. The method according to any one of claims 3 to 5, wherein step (c) is a reaction conducted at a temperature of 120 to 250° C. with a pressure of 2 to 20 kg·f/cm² for 1 to 24 hours.

14. The method according to any one of claims 3 to 5, wherein the surface treatment agent is at least one selected from the group consisting of fatty acid, fatty acid salts, metal alkoxide and a silane coupling agent.

15. The method according to any one of claims 3 to 5, wherein an added amount of the surface treatment agent ranges from 0.1 to 10 wt. %.

* * * * *

UNITED STATES PATENT AND TRADEMARK OFFICE
CERTIFICATE OF CORRECTION

PATENT NO.        : 8,623,320 B2
APPLICATION NO.   : 13/646291
DATED             : January 7, 2014
INVENTOR(S)       : Seok Keun Song Page 1 of 1

It is certified that error appears in the above-identified patent and that said Letters Patent is hereby corrected as shown below:

In the Claims

In Claim 2, Line 66, Column 2, insert --$HSiO_3^{3-}$,-- between "$SiO_3^{2-}$," and "$HSi_2O^5$,"

Signed and Sealed this
Fourth Day of March, 2014

Michelle K. Lee
*Deputy Director of the United States Patent and Trademark Office*